A. W. BRINKERHOFF & A. T. BARNES.
FRUIT GATHERER.
No. 36,334. Patented Sept. 2, 1862.
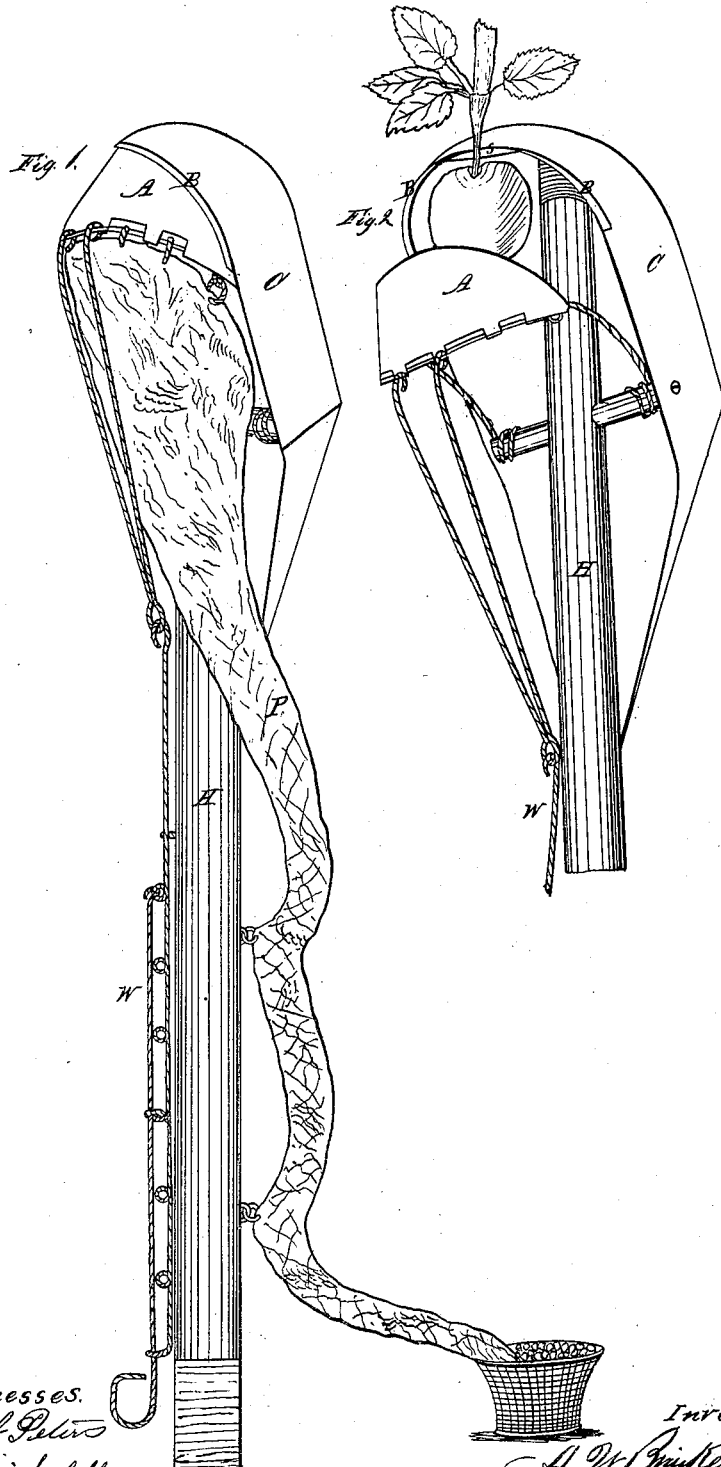

UNITED STATES PATENT OFFICE.

A. W. BRINKERHOFF, OF UPPER SANDUSKY, AND A. T. BARNES, OF TIFFIN, OHIO.

IMPROVEMENT IN FRUIT-GATHERERS.

Specification forming part of Letters Patent No. 36,334, dated September 2, 1862.

*To all whom it may concern:*

Be it known that we, ALEXANDER W. BRINKERHOFF, of Upper Sandusky, in the county of Wyandot and State of Ohio, and A. T. BARNES, of Tiffin, in the county of Seneca and State of Ohio, have invented new and useful Improvements in Machines for Gathering Fruit; and we do hereby declare that the following is a full, clear, and exact description of the construction and operation of the same, reference being had to the annexed drawings, making a part of this specification, in which—

Figure 1 is a side view of the whole machine. Fig. 2 is a perspective view of the upper or top section of the same with jaws expanded for the reception of the fruit as when in use.

The nature of our invention consists in so constructing a fruit-gatherer as when in use to have it represent and perform its work with the same ease and care of the natural hand, the cap or upper jaw of the same corresponding to the figures and back of the hand, while the lower jaw performs the office of the thumb; also, in our improved method of conducting the fruit from the tree to the earth.

In Fig. 1, C is the cap or upper jaw, made of tin or other light metal, and provided with blade B and stop S, Fig. 2, said blade B being attached to the under or in side and extending entirely across and projecting slightly forward of the arched front of said cap or upper jaw. Stop S is attached to the under side of blade B and a little back of the front edge of the blade, for the purpose of preventing the lower jaw from passing too far into the cavity of cap C. Cap C inclines inward toward its lower point, thereby enabling its removal from among the limbs or branches with the greatest ease and precisely as the natural hand is withdrawn. Cap C, being entirely formed of metal and in the manner described, is not only durable, but is free from all the objections which belong to the use of canvas, while its top, inclining forward, enables the operator to gather the fruit on the upper as well as the lower sides of the branches, which cannot be done with canvas or wire bags or baskets. The lower jaw, A, is formed of strong wire, its arched top being covered with sheet metal and of the proper shape to fit the mouth of cap or upper jaw, C, and just beneath the blade B, for the purpose of severing the fruit from the branch. A spiral spring is formed on the ends of the wire forming the lower jaw, A, for the purpose of securing it to the cross-pin in the top of handle H, and to cause it to close with force against the stem of apple. The handle H is provided with a socket at its lower end for the purpose of extending it to any desired length, and is secured to cap C, within its cavity, by screws at bottom, sides, and back. W is an adjustable wire for operating the lower jaw, A, the one attached to said jaw being provided with loops, while that grasped by the hand of the operator is provided with a hook at its upper end for the purpose of changing to the different loops above and a loop below for the hand of the operator. Conductor P, made of common sheeting, is attached to the lower end of lower jaw, A, and cross-pin in tod of handle H, and then passes downward until the lower end is received by a basket or bag on the ground, into which the fruit is deposited. Said spout or conductor P is attached at proper distances to handle H, thereby giving it a crooked form to cause the fruit to pass down slowly and save it from becoming bruised.

To enable others to make and use our invention, we will now proceed to describe its construction and operation.

To the top of the handle, a few inches from the point of which is inserted a cross-pin, attach the cap C, with its blade B and stop S, as described, by inserting screws through the metal cap into the points of handle H, cross-pin in its upper end, (after first placing thereon the lower jaw, A,) and one through the lower end of cap into the handle. Attach the adjustable actuating-wire to the center of the lower edge of metallic cover on lower jaw, A, and then let it pass through a staple a few inches below on handle H, extending then downward the desired distance for the hand of operator, and changing it when desired, as wanted for use. Make the mouth of conductor P wide enough to conform to bottom of lower jaw, A, to which attach it, and also attach one side of it to handle H at about every two feet apart, allowing it to sag slightly between the attachments to said handle to prevent bruising of fruit, and connect with its lower end on the ground the receptacle for the fruit.

In the operation of this machine let the operator stand on the ground, grasp the adjustable wire in his right hand, raise the jaws to the fruit, and open them by drawing downward on the wire until the opening is sufficiently wide for the fruit to enter, and when in let it close quickly, and the lower jaw will press the stem against the blade, thereby severing its connection with the branch without shaking off any other fruit, while at the same moment the fruit passes through the conductor to the ground, leaving the top of the gatherer as light as ever, and avoiding all necessity for lowering and emptying, and making the labor very easy and light.

Having thus fully described our invention, its mode of construction, and operation, what we claim as new, and desire to secure by Letters Patent, is—

1. In fruit-gatherers, the use of the metallic cap or upper jaw, C, with blade B and stop, S, substantially as and for the purposes described.

2. In combination with cap or upper jaw, C, blade B, and stop S, the arrangement of handle H, lower jaw, A, adjustable actuating-wires W, and conductor P, substantially as and for the purposes set forth.

ALEXANDER W. BRINKERHOFF.
    A. T. BARNES.

Witnesses:
 HENRY S. PETERS,
 M. H. BRINKERHOFF.